United States Patent [19]
Edlund

[11] 3,942,806
[45] Mar. 9, 1976

[54] SEALING RING STRUCTURE

[75] Inventor: Roy Edlund, Stuttgart-Botnang, Germany

[73] Assignee: Firma Busak & Luyken KG., Stuttgart, Germany

[22] Filed: May 6, 1974

[21] Appl. No.: 467,576

[30] Foreign Application Priority Data
May 17, 1973 Germany............................ 2325000
July 12, 1973 Germany............................ 2335452

[52] U.S. Cl. .................. 277/165; 277/227; 277/24; 277/45
[51] Int. Cl.² ........................................... F16J 9/00
[58] Field of Search ........... 277/165, 139, 140, 152, 277/24, 45, 227, 229, 205, 208

[56] References Cited
UNITED STATES PATENTS

| | | | |
|---|---|---|---|
| 2,372,095 | 3/1945 | Leistensnider et al............. | 277/205 |
| 2,587,405 | 2/1952 | Stevens et al...................... | 277/205 |
| 2,778,695 | 1/1957 | Sturtevant.......................... | 277/208 |
| 2,906,552 | 9/1959 | White ................................ | 277/227 |
| 3,033,578 | 5/1962 | Kellogg............................. | 277/165 |
| 3,057,630 | 10/1962 | Sneed ................................ | 277/165 |
| 3,271,038 | 9/1966 | Bastow............................... | 277/205 |
| 3,469,854 | 9/1969 | Linwood............................ | 277/227 |
| 3,594,012 | 7/1971 | Whittaker et al.................. | 277/208 |
| 3,663,024 | 5/1972 | Traub ................................ | 277/165 |

Primary Examiner—Richard E. Aegerter
Assistant Examiner—L. Footland

[57] ABSTRACT

A Sealing Ring Structure useful for pistons and piston rods has a sealing section and a stressing section for pressing a contact surface of the sealing section into engagement with a moving surface to be sealed. The sealing and stressing sections may be separate rings or may be layers of different material in an integral multilayer laminate. The contact surface of the sealing section is of small axial length compared with the overall length of the structure and is located between a recess in the sealing section on the high pressure side of the structure and an inclined surface of the sealing section which defines a wedge-like gap between the structure and the moving surface to be sealed which gap diverges towards the low pressure end of the structure.

11 Claims, 9 Drawing Figures

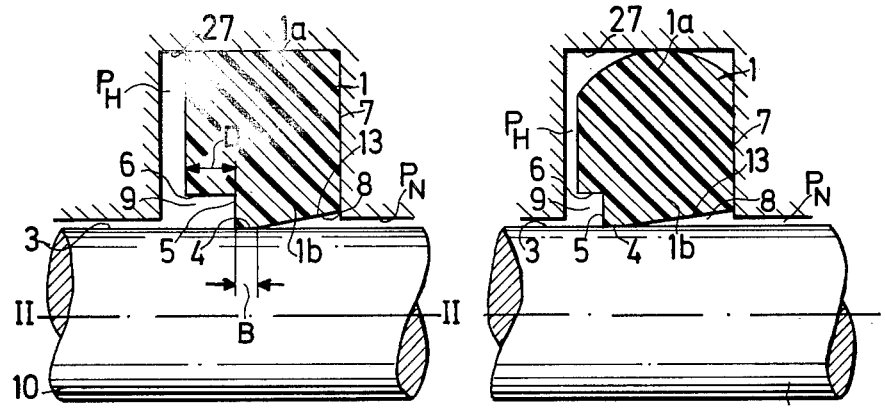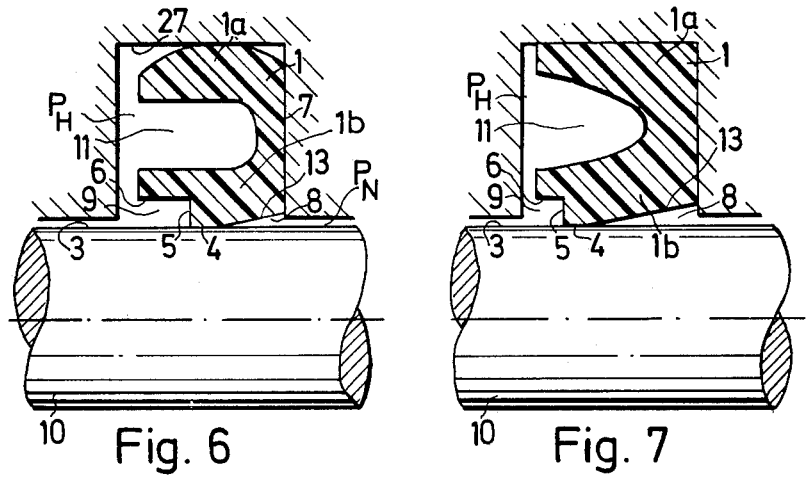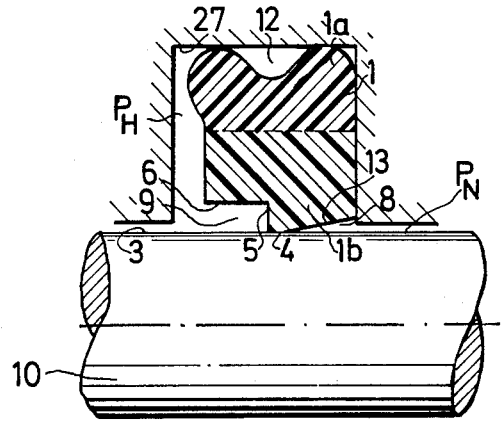

3,942,806

SEALING RING STRUCTURE

BACKGROUND OF THE INVENTION

This invention relates to a sealing ring structure useful for hydraulically operated pistons or piston rods. The invention is applicable to sealing ring structures comprising a tough elastic sealing ring which may be of a thermoplastic substance, e.g. based on polytetraflure ethylene and a separate highly elastic stressing ring for pressing radially on the sealing ring and preferably consisting of rubber, or to integral structures having a sealing section produced from an elastic material or a combination of materials to provide a tough elastic sealing section and integral highly elastic stressing section, the structure in either case being used as a contact seal between a stationary and a moving machine element, the sealing ring or the sealing section having an intrinsically elastic radial initial stress.

In the case of piston and piston rod seals of the above nature, it is necessary that a slight leakage be retained during reciprocating displacement. For low-friction sealing of reciprocating pistons and piston rods, use is made inter alia of two-piece seals, consisting of a synthetic material ring having a substantially rectangular cross-section for sealing the gap established by relative displacement between the machine elements displaceable with respect to each other, and of a rubber-elastic ring for secondary sealing and prestressing of the synthetic material ring. For the purpose of clear distinction, reference will be made hereinafter to the synthetic material ring establishing the moving seal as the sealing ring, and to the rubber-elastic ring thrusting the synthetic material ring into contact as a result of pressure-induced transverse thrust and over-dimensionally induced initial stress, as the stressing ring.

The sealing ring and stressing ring are commonly situated together within a groove or recess of the housing (for a rod seal) or of the piston (for a piston seal). The stressing ring commonly comprises a rubber-elastic ring of circular (O-ring) or rectangular cross-section, and its axis of radial symmetry is situated on an extension of the axis of radial symmetry of the rectangular sealing ring. As a result of radial prestressing of the stressing ring between the bottom of the groove and the external surface of the sealing ring situated opposite to the moved sealing gap which is the outer surface (in the case of the rod seal) or the inner surface (in the case of the piston seal), the secondary leakage path between the sealing ring and the bottom of the groove and the sealing ring is closed.

Practical experience has shown that the coefficients of friction of such combined seals are substantially smaller, above all upon starting up and at low stroke speeds, than in the case of conventional seals comprising rubber-elastic contact surfaces on the moving machine element.

Practical experience also indicates however that the combination consisting of a sealing ring having a substantially rectangular cross-section and of a stressing ring, has approximately the same leakage behaviour as conventional rubber-elastic contact seals. In this case too, a "drag" flow resulting in the forming of a lubricating film with intermittent separation of the sealing contact surfaces can occur during the reciprocating displacement as a result of the viscosity of the fluid which is to be sealed. As a consequence of the asymmetrical pressure distribution within the area of contact, a lubricating film of different thickness is commonly formed during the outward and return strokes, which can result in accumulation of fluid to be sealed off, at the low-pressure extremity of the sealing gap and thus in leakage.

It is an object of the present invention to reduce the leakage during reciprocating displacement of the piston rod or of the piston by appropriately forming and arranging the sealing ring, without increasing the frictional values.

SUMMARY OF THE INVENTION

The invention provides a sealing ring structure comprising a sealing section and a stressing section for radially pressing a contact surface of the sealing section into engagement with a moving surface to be sealed wherein the contact surface under compression is of relatively small axial extent in relation to the axial extent of the structure and is formed between a cylindrical recess formed at one axial end of the sealing section having a radial edge, from which a conical recess is formed extending in an inclined surface toward the other end of the sealing section adapted to provide a wedge-like gap between the structure and the moving surface to be sealed diverging towards the low pressure end of the structure.

With this arrangement, a contact surface of minimum axial length is formed, and as steep as possible a rise of the (specific) areal pressure between the sealing ring and the rod to be sealed may be obtained at the high-pressure side at the beginning of the contact surface, whereas at the low-pressure side of the contact surface, as shallow as possible a drop in areal pressure is set up through the wedge-shaped annular gap widening out at the smallest angle possible behind the extremity of the contact surface towards the low-pressure side end face of the sealing ring. Moreover, the contact surface is partially relieved of the radial contact pressure of the fluid and of the stressing ring. If, for example in the case of a rod seal, the internal surface of the sealing ring (being the external surface in the case of a piston seal) is conically formed and the radial thickness of the sealing ring is such as to establish an adequate resistance of the sealing ring against inversion to withstand radial stressing by the stressing ring, in conjunction with the modulus of elasticity of the material of the sealing ring, the desirable narrow contact area, as well as the favourable pressure distribution in combination with the annular gap opening out in approximately wedge-like manner as the low-pressure side, are established upon installing the sealing ring. Since a complementary elastic inverting movement of the sealing ring reduces the angle of the wedge-shaped gap as the sealing pressure rises, at higher pressures the hydrodynamic return displacement of fluid adhering to the friction surface is promoted.

DESCRIPTION OF THE INVENTION

The desirable steep rise in areal pressure at the high-pressure end of the contact surface is engendered by means of as sharp-edged a shoulder as possible at this point. The point at which this shoulder is formed (i.e. the intersection of the radial edge and the conical surface) may also be moved away from the high-pressure end face of the sealing ring and moved further into the sealing gap. This produces — at the high-pressure side and before the contact surface — an area comprising a larger gap receiving the pressure which is to be contained, thereby causing an action relieving the contact surface of the radial contact pressure which is generated by the intrinsic stress of the sealing ring, the initial overdimensionally induced thrust of the stressing ring and by the sealing pressure transmitted in a radial direction by the stressing ring.

The sealing ring is preferably so dimensioned with respect to its companion or mating sealing surface, that the piston rod (or cylinder bore) as compared to the diameter at the high-pressure extremity of the conical internal surface (or external surface) of the sealing ring extending towards the low-pressure side has a greater (or smaller) dimension such that upon installing the same, a very narrow contact surface is formed as compared to the axial width of the sealing ring.

During tests making use of an O-ring as a stressing ring, the value 2 : 5 was determined as a particularly advantageous ratio of the length between the high-pressure end face of the sealing ring and the beginning of the contact surface, to the overall length of the sealing ring. The most favourable angle of opening of the low-pressure side wedge-shaped annular gap amounted to between 5° and 10° when sealing a conventional hydraulic oil. Other optimum values of the said parameters were established for other fluids.

In a development of the invention, the entire seal is formed in one piece of synthetic material, rubber or of a multilaminar combination of synthetic materials. The sealing ring may moreover also be subdivided into a highly elastic stressing section and a toughly elastic sealing section which, acts as a contact seal between a stationary and a moving machine element, with an intrinsically elastic initial radial stress and with an outward seal effective as a consequence of the pressure conditions.

The sealing section is formed such that the surface of the sealing ring which is displaced with respect to one of the machine elements and is turned towards the latter, has a recess formed at the high-pressure side within the sealing ring, which merges into a narrow contact surface between the sealing ring and the machine element, which is followed at the low-pressure side by an area extending at a small angle and forming a wedge-shaped annular gap.

Such a configuration of the sealing ring within the sealing gap, the configuration of the high-pressure side recess and of the low-pressure side wedge-shaped annular gap has the result that pressure distribution at the low-pressure side of the sealing ring is controllable, which effects a leakage reduction.

A reduction of the frictional losses is also established because "extrorsion" phenomena are largely eliminated as a result of the behaviour of the sealing ring.

Apart from an outward seal, an advantageous uniform contact pressure for the contact surface on the sliding machine element is effected, when a multilaminar synthetic material is used for the sealing ring, by means of a highly elastic stressing section opposed to a toughly elastic sealing section.

Another advantageous form of sealing ring is obtained if the annularly cylindrical contact surface is situated approximately in the central portion of the overall length of the sealing ring. In this manner, the tilting couple acting on the sealing ring — and thus the frictional forces — may be reduced.

Since the angle of the annular gap is reduced as the sealing pressure rises, by a complementary elastic deformation of the sealing section of the sealing ring, at higher pressures hydrodynamic return displacement of fluid adhering to the friction surface is promoted. The operation of the recess is the same as already described in the foregoing in respect of the two-piece seal.

For this purpose, it is possible in preferred embodiment of sealing ring which is constructed form a multilaminar synthetic material, for the toughly elastic sealing section to be situated within the gap between the two machine elements and the highly elastic stressing section within a receiving groove of one of the machine elements.

In another development of the invention, the incorporation of the two-piece seal comprising a sealing ring and a stressing ring, as well as that of the one-piece seal (comprising a combination of materials), may be arranged in such manner that two separate seals are positioned one behind the other with axial spacing and enclose a space between the stationary and moving machine elements, the sealing surface of each sealing ring or of each sealing section of an one-piece seal being provided at the high-pressure side with a recess which merges into a narrow contact surface between the sealing ring and the machine element which is to be sealed, and which is followed at the low-pressure side by an area extending a small angle and forming a wedge-shaped annular gap.

A configuration of this nature of the sealing rings, and in particular their consecutive arrangement, wherein they delimit a space between the stationary and moving machine elements, has the consequence that the leaking oil accumulating within the space is conveyed back to the high-pressure side from the space, as a consequence of the pressure potential built up within the space during the outward stroke, during the stoppage and return stroke of the moving machine element. Tests have produced the unexpected result that the oil loss by leakage is reduced approximately 40 times as much with the use of two seals set one behind the other axially, as compared to the use of a single seal.

Another improvement of the sealing action may be obtained if the contact surface is produced with sharp edges and makes linear contact with the machine element which is to be sealed.

BRIEF DESCRIPTION OF THE DRAWINGS

The invention will now be described by way of example with reference to the accompanying drawings in which:

FIGS. 4 to 7 are cross-sections through alternative forms of integral one-piece sealing ring structures, FIG. 8 is a cross-section through a sealing ring structure comprising a combination of two different materials and FIG. 9 is a cross-section through a pair of sealing ring structures installed one behind the other in an axial direction.

DESCRIPTION OF THE PREFERRED EMBODIMENTS

Figure 1:
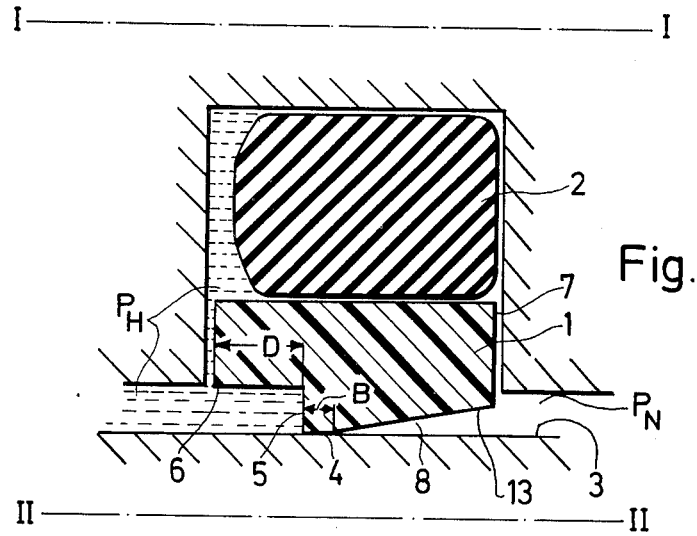
FIG. 1, is a cross-section through a sealing ring structure comprising a sealing ring and a stressing ring with a sharp-edged recess at the high-pressure side of the sealing ring.
Figure 2:
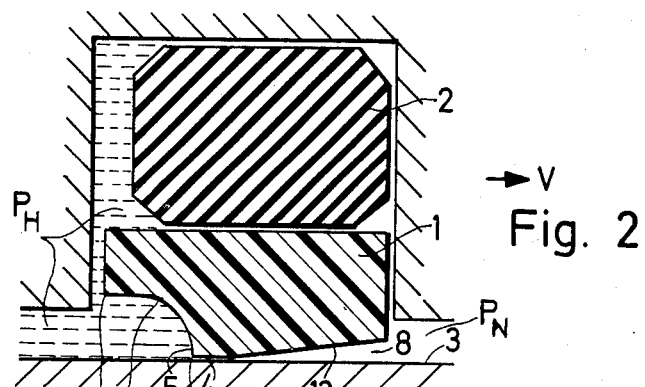
FIG. 2, is a cross-section through a structure similar to FIG. 1 with a convex recess.
Figure 3:
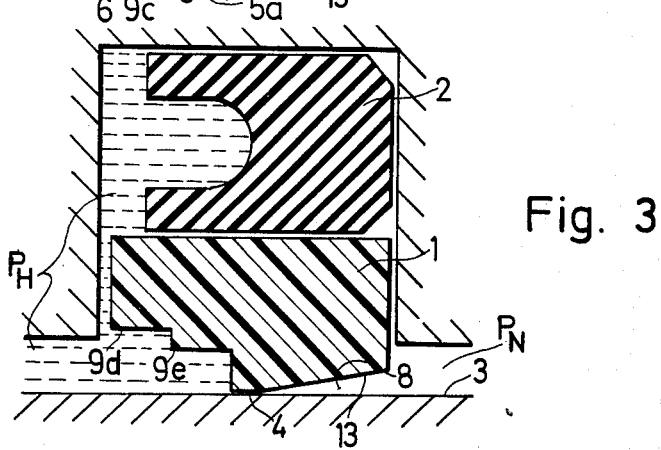
FIG. 3, is a cross-section through a structure similar to FIG. 1 with a step-like recess.

In all figures, $P_h$ denotes the higher pressure side on which the media is to be contained, and $p_N$ the lower pressure at the other side of the seal. As illustrated in FIGS. 1 to 3, a sealing section in the form of ring 1 is in contact with the surface 3 of a machine element and which is displaceable with repsect to it along a common contact surface 4, as a result of over-dimensionally induced intrinsic stress and as a result of the radial force produced by compression of a stressing section in the form of a separate concentric ring 2.

If the axis I—I is the axis of rotational symmetry, the seal in question is a piston seal, whereas the axis II—II characterises a rod seal.

The axial length B of the contact surface 4 is preferably very small as compared to the overall axial length of the sealing ring.

In FIG. 1, the sealing ring is cut back on the high pressure side to have a radial end-face 5 terminating with a sharp edge at the contact surface 4, and so that a relatively large recess (as compared to the thickness of the lubricating film between the contact surfaces during displacement) is formed over a length D between the cylindrical external surface 6 of the sealing ring 1 and the surface 3 of the machine element which is to be sealed.

Fluid at the pressure $p_H$ penetrates unrestrictedly into this recess up to the end face 5 and in radial direction on the surface 6 This acts to relieve the radial forces of the sealing ring 1 against the surface 3 and of the stressing ring 2 which acts against the ring 1 and thus determines the areal pressure on the contact surface 4. The degree of the relieving action depends on the length D. This action is preset as a compromise between the leakage on the one hand and attrition and friction of the seal on the other hand, and it thus depends on the conditions of application of the seal. Between the contact surface 4 and the low-pressure side end face 7, the ring 1 has an inclined surface 13 in such manner that a wedge-shaped annular gap 8 which diverges in the direction towards the end face 7 is formed between the surfaces 13 and the surface 3. The angle of the annular gap 8 is small because of the desirable gentle pressure drop at the low-pressure side within the area of contact which increases at higher pressure as a consequence of a tilting movement of the sealing ring, and preferably amounts to 5° to 10° in the case of sealing rings of synthetic material.

In FIG. 2, the outline 9c of the recess 5,6 is convex and a sharp-edged shoulder 5a which is advantageous in respect of a small lubricating film thickness during displacement of the surface 3 in the direction V (outward stroke) is again formed thereby at the high-pressure extremity of the contact surface 4.

Alternatively the outline at the high-pressure side may — as illustrated in FIG. 3 — comprise two cylindrical shoulders or recesses 9d and 9e or in generalised manner may comprises several partial sections with regularly or irregularly formed areas of transition.

In the embodiments shown in FIGS. 4 to 8, the sealing ring structure 1 comprises a multilaminar synthetic material ring whereof the stressing section 1a situated within a receiving groove 27 is of highly elastic nature, and whereof the sealing section 1b sliding on the external surface 3 of a rod 10 is of tough or less elastic nature. The stressing section 1a concomitantly has the task of providing an initial radial stress on the sealing section by virtue of its intrinsic elasticity, said sealing section bearing with its annularly cylindrical contact surface 4 on the external surface 3 of the rod 10.

The possibilities for a rod or piston seal are complementarily illustrated in FIG. 4. The case is that of a piston seal if the line I—I forms the central axis. The seal in question is a rod seal, if the line II—II is the central axis.

The axial length of the contact surface 4 is preferably very small as compared to the overall length of the sealing ring 1 and commonly amounts to approximately 0.5 mm.

In FIG. 4, the sealing ring 1 is equipped at the high-pressure side with a step-like recess 9 which has an end face 5 joining the contact surface 4 at a sharp edge. The recess 9 forms a relatively large gap, over the length D, between the internal surface 6 of the recess 9 and the external surface 3 of the rod 10. Between the contact surface 4 and the low-pressure end face 7, the sealing ring 1 has formed on it a surface 13 which with the rod 10 forms a wedge-shaped annular gap 8, which diverges in the direction towards the end face 7. The incline of the surface 13 is very small because of the desirable gentle pressure drop at the low-pressure side within the contact surface which increases under higher pressures as a consequence of tilting movement of the sealing ring, and preferably amounts to 5° - 10° in the case of sealing rings of synthetic material.

In FIG. 5, the length of the step-like recess 9 has been kept shorter, so that the sealing ring 1 has a higher degree of stability. The external surface of the stressing section 1a of the sealing ring 1 situated within the receiving groove 2 is of rounded form, analogous to an O-ring. The sealing ring 1 also operates in accordance with the principle of an O-ring, the action of the pressure $p_H$ pressing it against the right-hand side, and simultaneously pressing its rounded external surface against the bottom of the receiving groove 2, to shut off the secondary leakage path between the sealing ring 1 and the bottom of the groove.

In FIGS. 6 and 7, an encircling "enlargement" 11 or concavity open towards the high-pressure side $P_H$ is formed in the sealing ring 1. Complementary stressing means intended to increase the contact pressure on the sealing section 1b may be situated within the concavity 11, if the intrinsic elasticity of the material is insufficient, or non-existent as in the case of Teflon. The inserts may consist of a highly elastic O-ring, or of a spring. At the same time however, the stressing section 1a is sealingly thrust evenly against the right-hand side of the receiving groove 27 and against the bottom of the groove, by the high pressure $P_H$.

To reduce a tilting couple acting on the sealing ring during the return stroke of the moving machine element as a consequence of the pressure $P_H$, the external surface turned towards the bottom of the receiving groove 2 is provided with an encircling groove 12. This tilting couple may be reduced complementarily, by preferably positioning the contact surface 4 approximately within the central portion of the overall length of the sealing ring 1 (FIG. 8).

Figure 9:
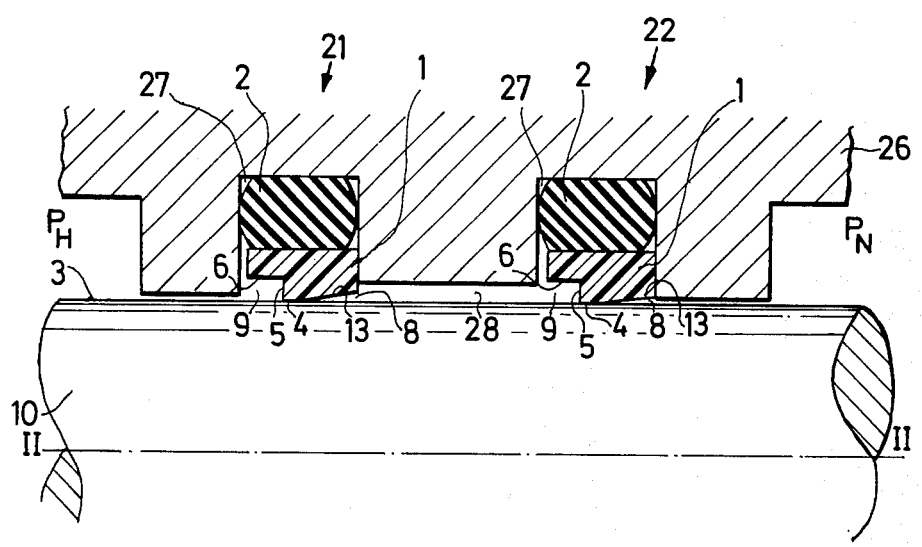

In the embodiment illustrated in FIG. 9, two seals 21 and 22 depicted in FIG. 1 are positioned axially in series. It is also possible however for seals such as have been shown in FIGS. 2 to 8, to be arranged one behind the other, thereby securing the same action. Each seal 21 and 22 comprises a sealing ring 1 which is prestressed in a radial direction towards the machine element which is to be sealed, by means of a stressing ring 2 in the form of an O-ring. Whereas the sealing ring 1 preferably consists of a synthetic material based on polytetrafluoroethylene, use is preferably made of rubber as the material for the stressing ring 2. The seals 21 and 22 in each case are situated within a receiving groove 27 machined into the stationary machine element 26.

Each sealing ring 1 is provided at the high-pressure side with a step-like recess 9 which has an end face 5 joining spring a contact surface 4 with a sharp edge. This recess 9 forms a relatively large gap between the internal surface 6 of the recess 9 and the external surface 3 of the rod 10. The contact surface 4 may also be formed with a sharp edge however and make a linear contact with the moving machine element.

Surfaces 13 forming wedge-shaped annular gaps 8 with the rod 10, are formed on the sealing rings 1 of the seals 21 and 22. The annular gap 8 of the first seal 21 and the recess 9 concomitantly define a space 28 between the second seal 22 of the rod 10 and the stationary machine element 26. This measure has the consequence that the leaking oil accumulating within the space 28 during the outward stroke of the rod is not scraped off and thus lost during the return stroke of the rod 10. On the contrary, a pressure potential is built up within the space 28, whereby the oil present within the space 28 is returned through the wedge-shaped annular gap 8 to the high-pressure side $P_H$ and into the working space during the stoppage or return stroke of the rod 10.

In this way, the oil leakage losses may be reduced by approximately 40 times as compared to a single seal, the frictional losses between the seal and the moving machine element not being increased appreciably.

I claim:

1. A ring seal for effecting a fluid seal between a pair of members one of which is movable with respect to the other the improvement, comprising an annular sealing section and a concentric stressing section adapted to radially bias said sealing section, said sealing section having a contact surface adapted to slidably engage said movable member, said contact surface defined by a the intersection of cylindrical recess extending axially inwardly from one end thereof terminating in a radially extending edge and by a radially inwardly inclined conical recess extending axially inward from the opposite end thereof, said sealing section being arranged with respect to said movable parts so that said cylindrical recess faces the high pressure side of said seal and said conical recess faces the low pressure side of said seal.

2. The assembly according to claim 1 wherein said sealing and stressing sections are formed of material having different elasticities.

3. The assembly according to claim 1 wherein the sealing section and the stressing section comprise independent rings.

4. The assembly according to claim 1 wherein said sealing and stressing sections are formed as an integral laminar structure wherein the stressing section is formed of material having a greater elasticity than the material of the sealing section.

5. The assembly according to claim 1 wherein the radial depth of said cylindrical recess, from the surface of the movable part, is at least 0.3 mm.

6. The assembly according to claim 1 wherein the conical recess diverges at an angle of less than 10°.

7. The assembly according to claim 1 wherein the radial edge is connected to the outer wall of said cylindrical recess by a curved boundry wall.

8. The assembly according to claim 1 wherein said cylindrical recess is provided with at least one step.

9. The assembly according to claim 1 wherein said contact surface is disposed axially substantially centrally of the sealing section.

10. The apparatus for effecting a seal between two members one of which is movable with respect to the other, comprising a pair of annular seal ring assemblies according to claim 1, axially spaced from each other disposed between said members, one of said members being formed with an annular space arranged between said two sealing ring assemblies, to provide communication therebetween of a fluid media.

11. The apparatus according to claim 10 wherein the annular space between said seal ring assemblies communicates with the conical recess of one and the cylindrical recess of the other of said ring assemblies.

* * * * *